United States Patent [19]

Martin

[11] Patent Number: 5,562,935
[45] Date of Patent: Oct. 8, 1996

[54] QUICK CHANGE SYSTEM FOR MOLD BASES

[75] Inventor: Roger G. Martin, Greenville, Mich.

[73] Assignee: Master Unit Die Products, Inc., Greenville, Mich.

[21] Appl. No.: 347,970

[22] Filed: Dec. 1, 1994

Related U.S. Application Data

[60] Continuation-in-part of Ser. No. 261,389, Jun. 17, 1994, Pat. No. 5,439,368, which is a division of Ser. No. 920,612, Jul. 27, 1992, Pat. No. 5,350,289.

[51] Int. Cl.$^6$ .................................................. B29C 35/00
[52] U.S. Cl. .................... 425/552; 264/328.16; 425/144; 425/190
[58] Field of Search ........................... 264/328.1, 328.16, 264/334; 425/144, 182, 186, 188, 190, 192 R, 193, 195, 407, 552, 556, DIG. 110, DIG. 246

[56] References Cited

U.S. PATENT DOCUMENTS

| | | |
|---|---|---|
| 3,733,161 | 5/1973 | Nussbaum ............................... 425/144 |
| 4,009,979 | 3/1977 | Martin . |
| 4,158,910 | 6/1979 | Hanas et al. . |
| 4,202,522 | 5/1980 | Hanas et al. . |
| 4,348,165 | 9/1982 | Vostrovsky . |
| 4,416,604 | 11/1983 | Bender et al. . |
| 4,472,127 | 9/1984 | Cyriax et al. . |
| 4,500,274 | 2/1985 | Cyriax et al. . |
| 4,500,275 | 2/1985 | Ruhl . |
| 4,714,421 | 12/1987 | D'Aostino . |
| 4,776,783 | 10/1988 | Pelle et al. . |
| 4,786,244 | 11/1988 | Holzschuh ............................... 425/552 |
| 4,793,785 | 12/1988 | Osada . |
| 4,805,285 | 2/1989 | Reyes . |
| 4,861,254 | 8/1989 | Takeuchi et al. . |
| 4,867,668 | 9/1989 | Miyairi . |
| 4,872,827 | 10/1989 | Noda ...................................... 425/552 |
| 4,888,252 | 12/1989 | Kilim . |
| 4,929,166 | 5/1990 | DiSimone et al. . |
| 5,012,568 | 5/1991 | DiSimone et al. . |
| 5,022,784 | 7/1991 | Martin . |
| 5,096,404 | 3/1992 | Janos et al. . |
| 5,350,289 | 9/1994 | Martin ...................................... 425/190 |

FOREIGN PATENT DOCUMENTS

| | | | |
|---|---|---|---|
| 62-35819 | 2/1987 | Japan ...................................... | 425/144 |
| 62-99126 | 5/1987 | Japan . | |

OTHER PUBLICATIONS

Exhibit A is product information published by Staubli Corp., Duncan, SC, date unknown, which discloses multi–coupling plates such as on pp. 9–13.

Exhibit B is a product brochure entitled "Budget Multi–Snap Multiple Coupling Systems," published by Budget Molders Supply, Inc., Macedonia, OH, date unknown, disclosing multi–connector manifolds for molds.

Exhibit C is a product brochure entitled "Multi–Couplings for Production Technology," published by Staubli, Duncan, SC, date unknown, including various multiple coupling arrangements including several for plastic injection modling equipment.

Exhibit D is a product brochure entitled "RMA Automatic Multi–Couplings," published by Staubli, publication date unknown, disclosing multi–couplings.

*Primary Examiner*—C. Scott Bushey
*Attorney, Agent, or Firm*—Price, Heneveld, Cooper, DeWitt & Litton

[57] ABSTRACT

A quick change system for standard mold bases in a molding machine includes an adapter frame mounted on the face of each platen of the press, each adapter frame having a U-shaped guide channel, and a support plate for supporting a mold base half for slideably engaging the channel. A coolant hookup manifold including first connectors is mounted on the adapter frame, and a second coolant hookup manifold including second connectors is mounted on the support plate. The first and second connectors are configured to automatically sealingly engage as the support plate and mold slide into engagement with the adapter frame.

16 Claims, 10 Drawing Sheets

QUICK CHANGE SYSTEM FOR MOLD BASES

CROSS REFERENCE TO RELATED APPLICATIONS

This is a continuation-in-part application of U.S. patent application Ser. No. 08/261,389, filed Jun. 17, 1994 (now U.S. Pat. No. 5,439,368, issued Aug. 8, 1995) entitled KNOCKOUT ROD ASSEMBLY FOR MOLD, which is a divisional application of a then U.S. patent application Ser. No. 07/920,612, filed Jul. 27, 1992 (now U.S. Pat. No. 5,350,289, issued Sep. 27, 1994) entitled QUICK CHANGE SYSTEM FOR MOLD BASES.

BACKGROUND OF THE INVENTION

An injection molding machine operates so rapidly that it can quickly finish a run of a particular molded part in a comparatively short period of time. In view of the substantial cost of the machine, it cannot be allowed to sit idle. The mold base in the machine has to be removed and a new mold base inserted so that the machine can continue to operate. The time taken in changing the mold base must be limited so the machine can again begin productive use. It currently takes from one to several hours to complete a mold base change. This lost time has a marked effect on the profitability of a company.

In order to speed up the mold change process, attempts have been made to equip the platens of the molding machines with an array of clamps and guides for supporting the mold base. For example, U.S. Pat. No. 4,500,274 issued to Cyriax et al. discloses a quick change mold assembly employing a plurality of spaced hydraulic clamps mounted on each platen of the press. Spaced guides are provided for receiving a plate attached to the back of a mold half. The clamps and guides are fastened directly to the platens. In order to add these parts, the press has to be disassembled so that the face of the platen can be drilled and tapped. There is no convenient way for machining the platen in the machine. After the platen is prepared, the clamps and guides are attached and the platen is reinstalled in the machine. This clearly involves a great expense which is limited to the particular machine. If the machine breaks or is down for service, the clamps and guides are not readily transferable to another machine. The use of many discrete guides and clamps on the platen face for supporting the mold base also compounds the problem of damage to the molding machine due to pieces of metal falling into the machine.

U.S. Pat. No. 4,714,421 issued to D'Agostino discloses a quick change system for mold bases having a T-shaped plate recessed in and attached to the back of each mold half. On the ejector side of the press, the entire ejector assembly is contained within a large clamp plate. The T-shaped plates are not readily interchangeable between mold bases. Also, the large clamp plate attached to the ejector side of the mold base limits the amount of available mold space in the injection molding machine.

The problem of changing mold bases is not limited to injection molding machines. Similar problems are presented in changing the die or mold in a stamping press. In both situations, the mold set weighs a substantial amount and must be handled carefully to avoid damage to the mold, die and press.

Another problem with known quick change systems is that a plurality of coolant lines must be connected to the mold base after the mold base is clamped into a molding machine. Typically numerous coolant lines must be connected, including at least one supply line and at least one return line for each of a core half and a cavity half of the mold base. These coolant lines often include quick disconnects to speed up their connection. However, the process of connecting the coolant lines is still difficult and time consuming for a number of reasons including poor lighting in the work area, the awkward position of the quick disconnects on the mold, the limited space available around the mold when in a machine, and, on larger molds, the amount of force necessary to connect the quick disconnects. Further, at least a small amount of coolant is spilled during each connection/disconnection of a coolant line and thus the coolant lines can become slippery, messy, dirty and/or generally an entangled mass. As a result of these problems, it is not uncommon for multiple coolant lines to be connected wrong, leading to unbalanced coolant flow or lack of coolant flow. This in turn leads to a poor cooling of the mold base halves, warped parts and slow machine cycle times.

It is known to utilize a multi-port apparatus for connecting multiple coolant lines to a mold during installation. For example, see the prior art disclosure materials appended hereto regarding "Multi-Couplings". However, presently there is no multi-coupling apparatus configured for use with the quick change system of the present invention. Notably, in the present invention, the apparatus slides into a molding machine in a direction parallel to the face of a platen to which the mold base is being attached.

Thus, an apparatus solving the aforementioned problems is desired.

SUMMARY OF THE INVENTION

In accordance with the present invention, a quick change apparatus for a mold base used in a press includes an ear plate for attachment to the back of each half of a mold base, and an adapter frame for attachment to each platen of a press, the adapter frame including a pair of guide channels for receiving and supporting the ear plate. A first coolant hookup manifold is attached to the ear plate and operatively connected to the mold base for communicating coolant thereto, and a second coolant hookup manifold is attached to the adapter frame and operatively connected to a supply of coolant. In a preferred form, the first and second coolant hookup manifolds include mating connectors for automatic interconnection when the ear plate is slideably installed in the adapter frame. The quick change system of the present invention allows mold bases, equipped with standard ear plates and further equipped with mating coolant hookup manifolds, to be changed in a press in ten minutes, or even less time.

BRIEF DESCRIPTION OF THE DRAWINGS

FIG. 22 is a fragmentary plan view of a modified ear plate for receiving the ten connector coolant hookup manifold shown in FIG. 19;

FIG. 23 is an end view of the modified ear plate shown in FIG. 22;

DETAILED DESCRIPTION OF THE PREFERRED EMBODIMENTS

Figure 1:
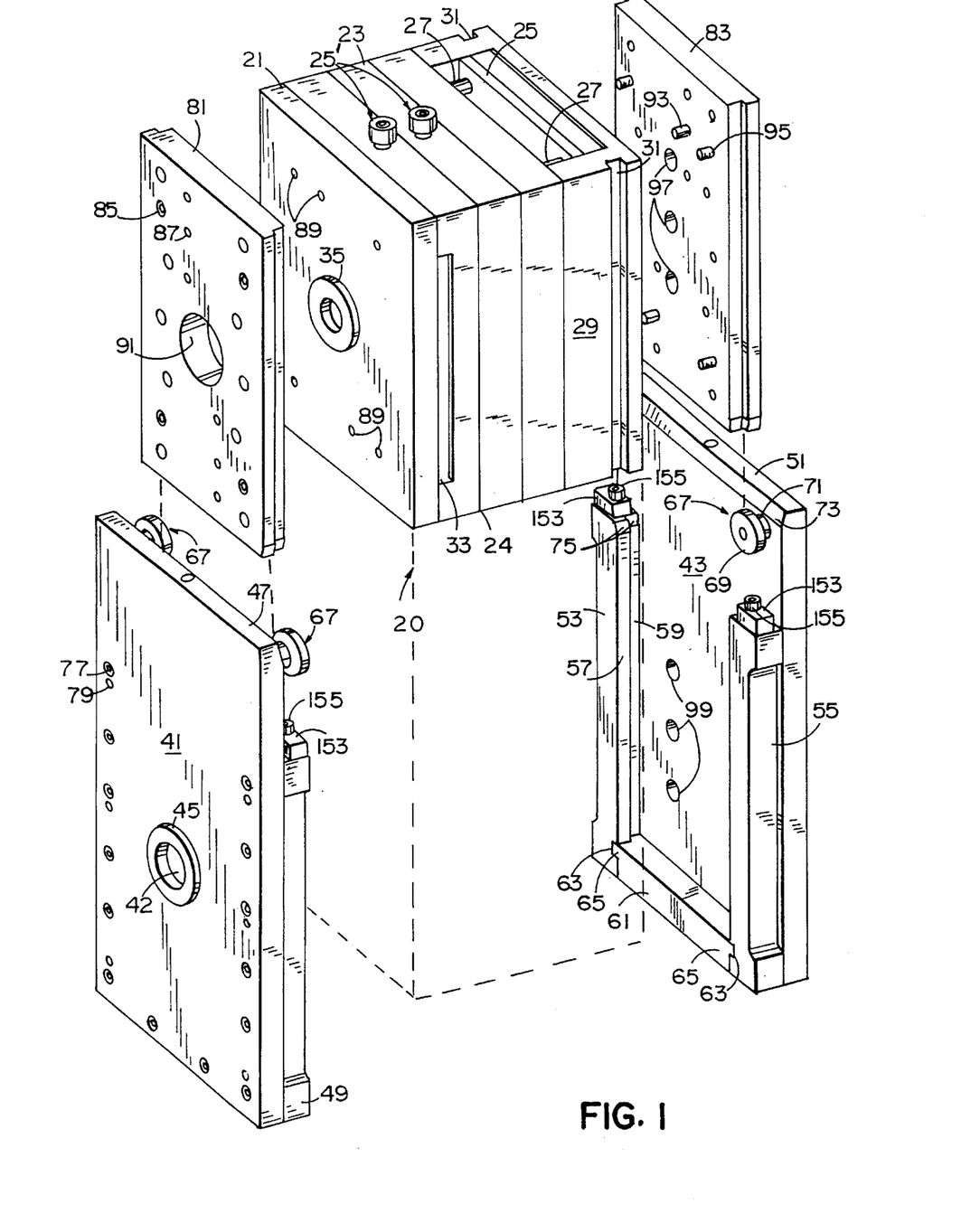
FIG. 1 is an exploded view showing the several components making up the quick change system of the present invention.

Referring to FIG. 1, a standard mold base is indicated generally by the number 20. The mold base has a cavity side 21 and an ejector side 23 which can separate along parting line 24. The ejector half of the mold base has an ejector plate 25 joining spaced ejector pins 27. The ejector assembly, including ejector plate 25 and ejector pins 27, is enclosed within an elongated, substantially U-shaped, clamp plate 29, which has a recess 31 along each side for clamps which can be used to attach the clamp plate to the platen of a press. A pair of lifting buttons 25' are attached to the top of cavity mold half 21 and ejector mold half 23. Cavity mold half 21, like ejector mold half 23, has a recess portion 33 for clamps which can be used to clamp the cavity mold half to the platen of an injection molding machine. An alignment ring 35 is attached to the cavity mold half.

As thus far described, mold base 20 is a standard mold base. A mold base of this type is typically held in the injection molding machine by a plurality of clamps which grip the mold base in recesses 31 and 33 and hold the mold base in position in the injection molding machine. In order to change this mold base for a larger or smaller mold base, it is necessary to loosen all of the clamps and then carefully lift the mold base from the machine without allowing it to damage any of the clamps or the platen of the machine.

In accordance with the present invention, a pair of adapter plates 41 and 43 are attached to the faces of the platens of the injection molding machine. Cavity half adapter frame 41 has an aperture 42 which can be aligned with ring 35 on the standard mold base. The aperture 42 is bounded by an alignment ring 45. The adapter frame has a base plate 47 upon which are mounted along each edge a guide rail member 49, only one of which is shown.

Adapter plate 43, also called an ejector frame plate, has a substantially rectangular base plate 51 which has supported on its face a pair of guide rail members 53 and 55. Each of the guide rail members has an overhanging edge portion 57 which forms a recess or groove 59 between the overhanging edge and the face of base plate 51. A stop member 61 is attached at a lower edge of base plate 51. Guide rails 53 and 55 each have a slot 63 for receiving a projecting tongue or key 65 at each end of stop member 61. Guide rails 53 and 55 and stop member 61 provide a channel on the surface of ejector frame plate 43. A similar channel is formed on the face of cavity half adapter frame 41.

Figure 5:
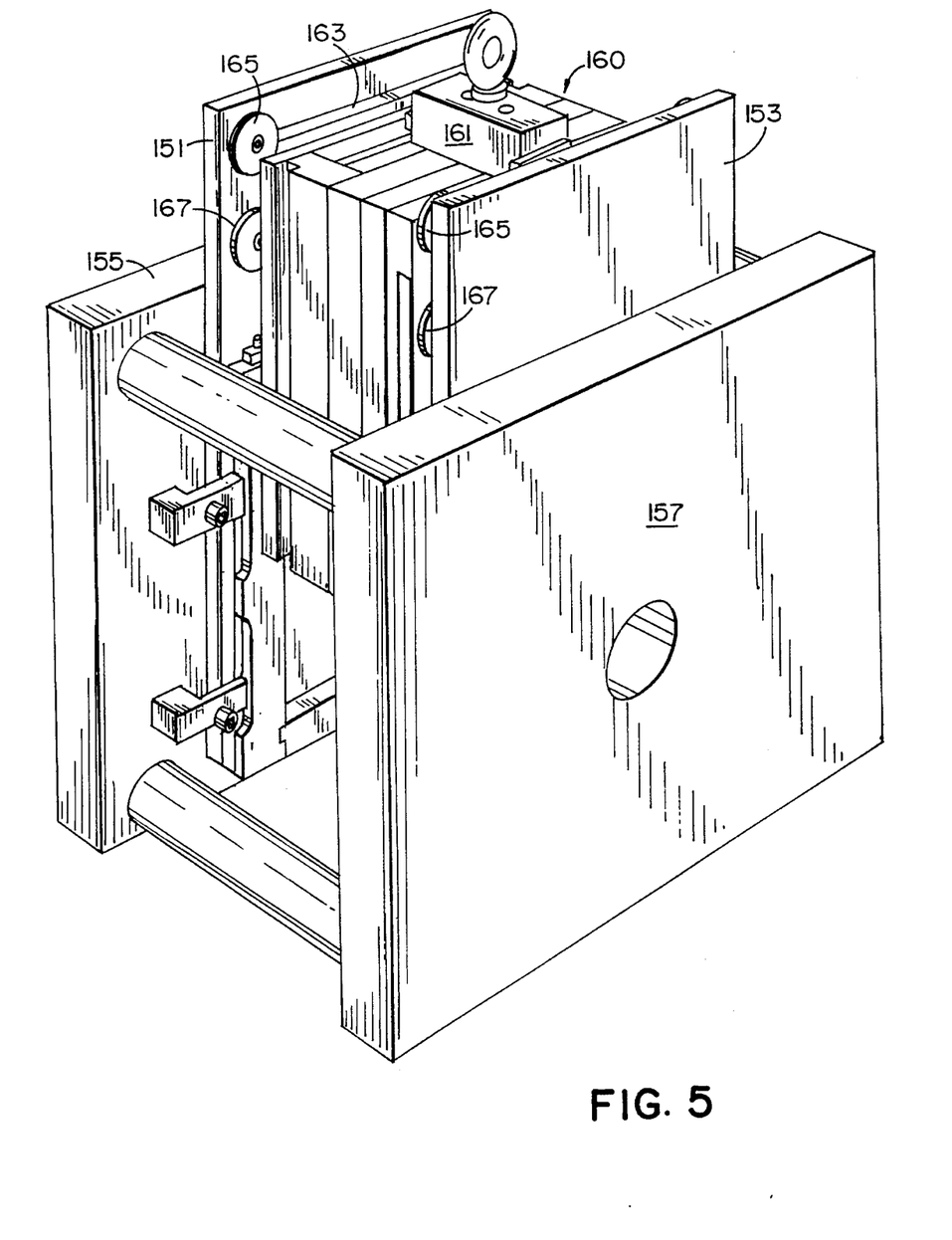
FIG. 5 is a perspective view showing a mold base equipped with ear plates being lowered into an adapter frame plate equipped with two sets of guide rollers.

A pair of T-shaped rollers 67 are mounted near the upper edge of base plates 47 and 51. Each of the rollers has an enlarged or horizontal T-arm 69 connected to a narrow roller surface 71. Only one roller is shown on ejector frame plate 43. A similar roller would be in the upper left-hand corner, as shown in FIG. 1. Also, more than one pair of guide rollers can be used as shown in FIG. 5. Similar rollers 67 are positioned near the upper edge of cavity frame plate 41.

It should be noted in FIG. 1 that the upper edge 73 of base plate 51 is relieved approximately 5° as are the leading edges 75 of guide rail members 53 and 55. The top edge of base plate 47, along with the attached guide rails, are similarly relieved to facilitate entry of the ear plates into the guide channels on the adapter frame plates.

A plurality of apertures 77 and 79 are provided along the edge of each of the adapter frame plates for fasteners such as cap screws and dowels to position and align the guide rail members and the stop members.

Returning now to mold base 20, in the upper portion of FIG. 1, a pair of ear plates 81 and 83 are shown positioned adjacent to the rear surfaces of the cavity mold half and the ejector mold half of the mold base. The cavity half ear plate has a plurality of apertures for fasteners 85 and dowels 87 for attaching the ear plate to the standard aperture pattern 89 on the back surface of the cavity mold half. An aperture 91 is provided in ear plate 81 in alignment with alignment ring 35. Ear plate 83 has a similar pattern of apertures for dowels 93 and threaded fasteners 95 for attaching an ear plate to the back surface of the adapter mold half ejector clamp plate 29. Ejector ear plate 83 also has a row of apertures 97 through which knockout rods (not shown) can pass to move ejector plate 25 and ejector pins 27. A similar pattern of apertures 99 is provided in ejector frame plate 43 for the passage of the knockout rods. The knockout rods pass through the platen of the injection molding machine, through apertures 99 in ejector frame plate 43, to actuate ejector push rods accessible through apertures 97 in ejector ear plate 83.

Figure 2:
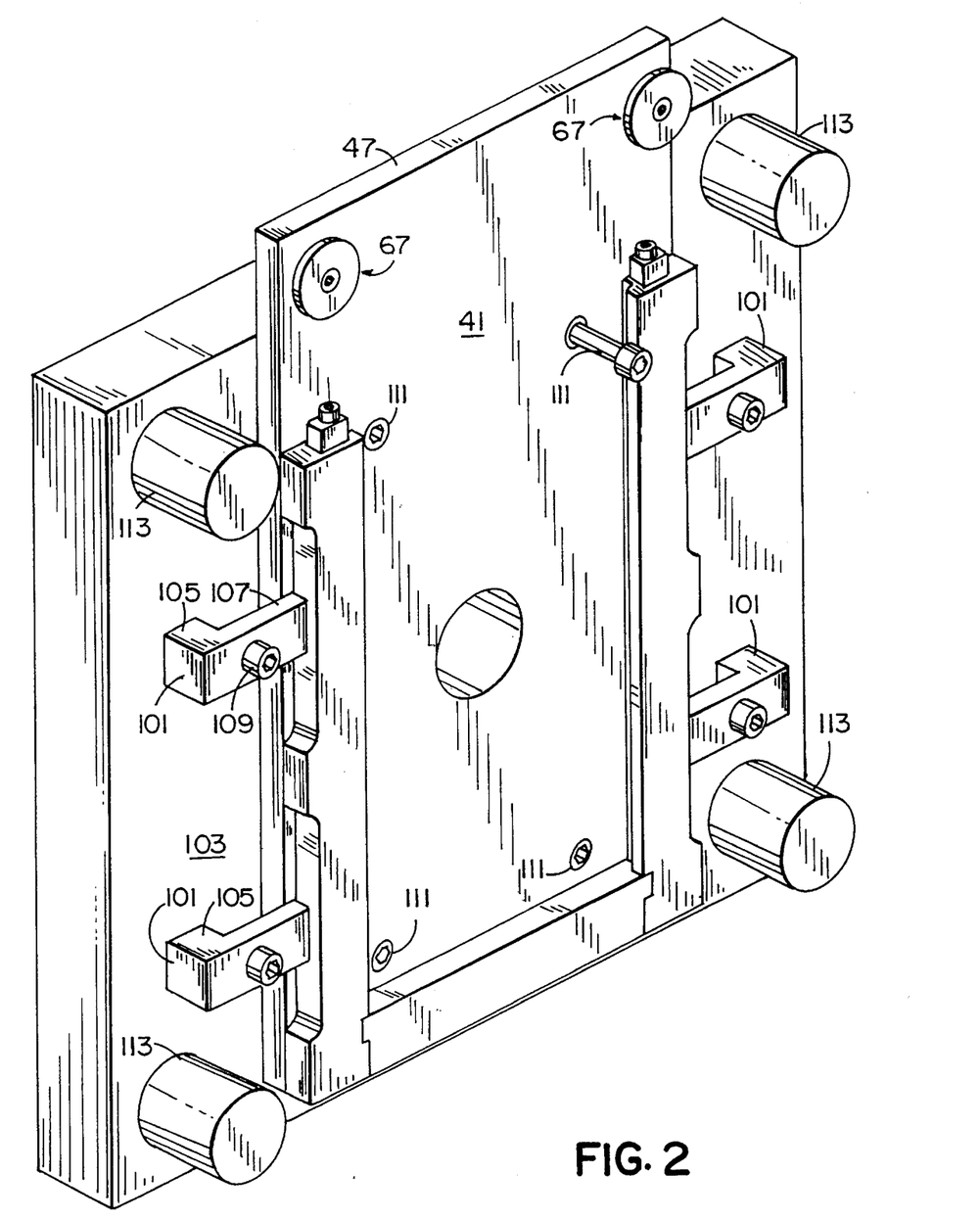
FIG. 2 is a perspective view of a cavity side adapter frame clamped to a press platen.

Adapter frame plates 41 and 43 are fastened directly to the platens of the injection molding machine. As shown in FIG. 2, cavity adapter frame plate 41 is held by a plurality of clamps 101 to the face of platen 103. Each clamp 101 has a riser portion 105 which spaces clamp portion 107 approximately the thickness of base plate 47. The clamp can be tightened in place by a screw, such as a cap screw 109, to hold the clamp and adapter frame plate in position. It is preferred to use fasteners such as cap screws 111 to hold the adapter frame plate in position on the face of platen 103. This is preferred in order to remove clamps 101 and screws 109 which might accidentally come lose and fall into the machine during the injection molding process. After the adapter frame is tightly fastened to the platen by screws 111, clamps 101 and clamp screws 109 can be removed from the platen. The tie bars 113 help to maintain proper alignment of the mold halves and also support the mass of the movable platen.

Figure 3:
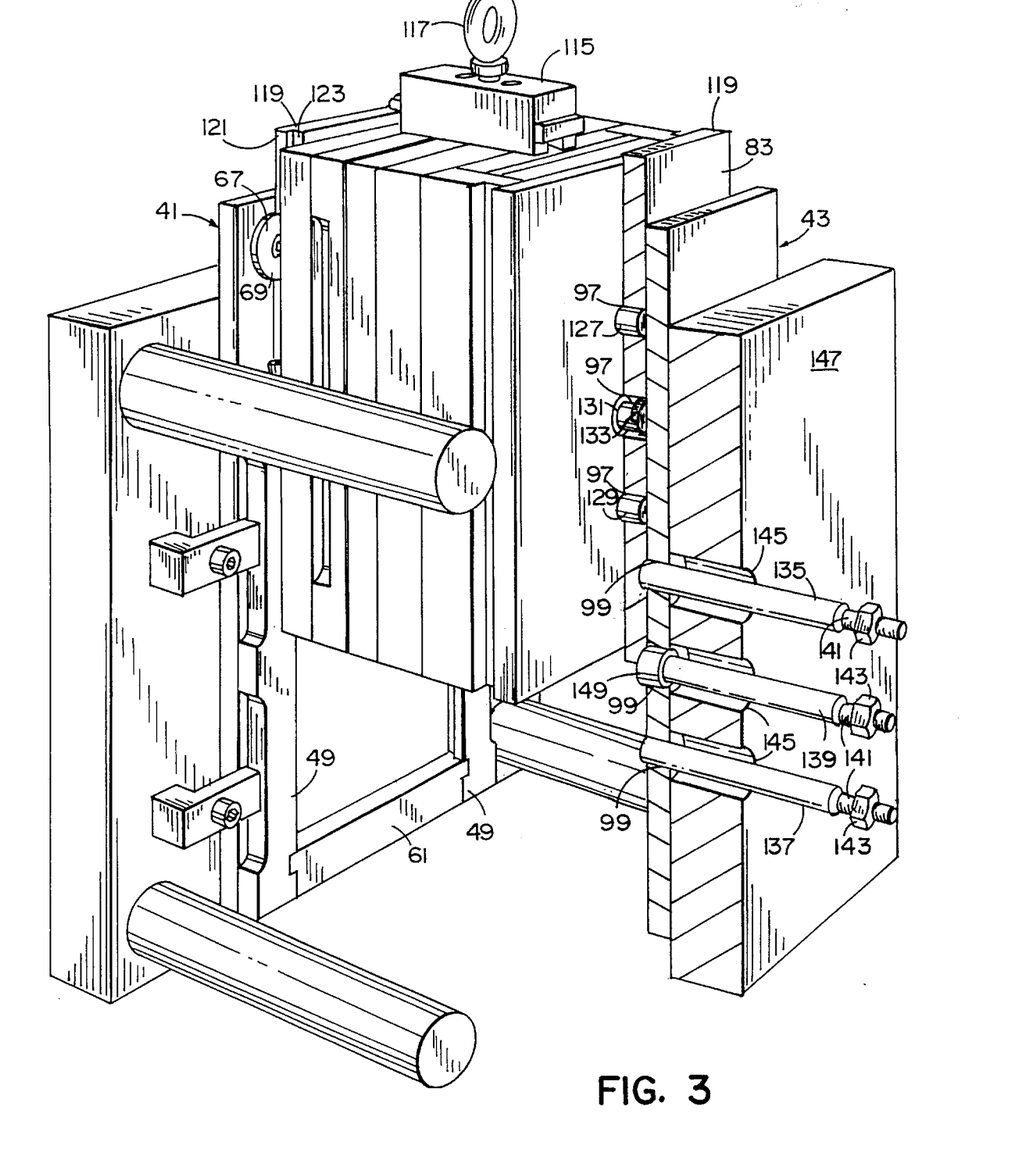
FIG. 3 is a perspective view, partially in section, showing a mold base being lowered into the supporting adapter frames and the knockout rods.

After ear plates 81 and 83 are attached to the back surfaces of the standard mold base 20 (FIG. 1), a mold balancing lifting bar 115 (FIG. 3) is slid over lifting buttons 25 on top of the mold base. The lifting bar can be moved back and forth, or to the left and right, as shown in FIG. 3, and lifted by means of a hook through I-ring 117 until the balance point of the mold is found where it hangs with the ear plates substantially perpendicular to the ground. Once the mold is precisely balanced, the position of the balancing and lifting bar can be marked on the top of the mold base with a scribe so that the lifting bar can be quickly positioned to lift the mold base. The mold balancing lifting bar is the subject of U.S. Pat. No. 5,033,784 issued Jul. 23, 1991, assigned to the same assignee as the present application. The balanced mold base can be moved over to the injection molding machine and slid into adapter frame plates 41 and 43. Each edge of the ear plate is stepped at 119 and adapted to slide behind guide roller 67 which facilitates easy entrance of the ear plate into the adapter frame. The narrow portion of the guide roller or the center leg of the T-shaped guide roller contacts the edge 121 of the ear plate while the enlarged or horizontal T portion 69 of the guide roller contacts the recessed surface 123 of the ear plate and captures stepped portion of the ear plate underneath the edge of the guide roller. Using the T-shaped guide roller, the ear plate is not only captured as it is lowered into the adapter frame, it is also carefully guided, like a drawer in a fine piece of furniture, to the bottom of the channel defined by guide rails 49 and stop member 61 on the face of cavity side adapter frame plate 41.

Referring to FIG. 5, adapter frame plates 151 and 153 are shown attached to press platens 155 and 157. The adapter frame plates are preferably the largest frame plates that will fit in the machine, enabling many different size mold bases to be used. A standard mold base 160 is supported by mold balancing and lifting bar 161, a supporting hook is not shown. An ear plate 163 is attached to the ejector side of the mold base. A similar ear plate (not shown) is attached to the cavity side of the mold base. Each adapter frame plate has an entry pair of guide rollers 165, only one of which is shown, on each adapter frame plate and a lower pair of guide rollers 167, only one of which is shown, on each adapter frame plate. The two pair of guide rollers facilitate the entry of the ear plates into the guide channel on each adapter frame plate. The ear plates are captured by the guide rollers and aligned before being lowered into the guide channel.

In order to activate the ejector mechanism in the mold base (FIG. 3), three connecting rods are provided for attachment to ejector plate 25 (FIG. 1 ). A top push rod 127, a bottom push rod 129 and a center push/pull ejector rod 131 are attached to ejector plate 25. The most convenient way for attaching the three rods is by threading the ends of the rods into threaded apertures in the ejector plate. Push/pull rod 13 1 has a pair of spaced ears, or projections, 133 along one face. Each of the ejector rods moves in apertures 97 provided in ear plate 83. Each of the rods is machined and mounted in the ejector plate so that the ends of the rods are substantially flush with the surface of ear plate 83 so that they will not interfere with the insertion and removal of the mold base from adapter frame plate 43.

It should be noted that while three knockout rods are shown in FIG. 3, a particular mold base may require fewer or more knockout rods. Regardless of the number of knockout rods used, they would be handled in a similar manner.

An injection molding machine is usually equipped with a hydraulic knockout mechanism. Three knockout rods are provided for attachment to this hydraulic knockout mechanism, a top push rod 135, a bottom push rod 137 and a center push/pull rod 139. Each of the knockout rods has a long threaded end portion 141 for attachment to the knockout mechanism. A threaded nut 143 is provided on each knockout rod for locking the rods to the hydraulic assembly in the injection molding machine. Each of the knockout rods passes through an aperture 99 in adapter frame plate 43. The knockout rods also pass through apertures 145 in platen 147.

Figure 4:
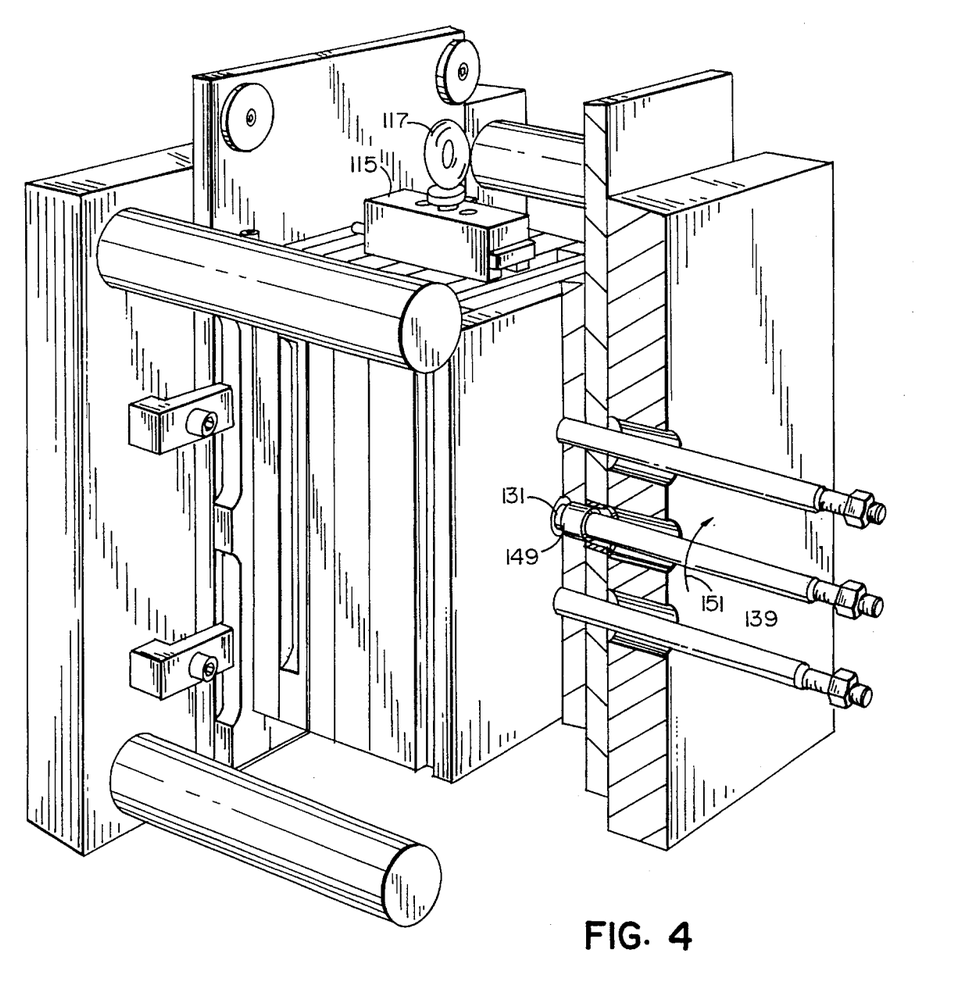
FIG. 4 is a perspective view showing the mold base of FIG. 4 in the adapter frames and with the push/pull knockout rod being twisted to lock the knockout rod to the push/pull rod attached to the ejector plate in the mold base.

Center push/pull knockout rod 139 has a locking collar 149 which can pass over the projecting ear portions 133 on push/pull rod 131 and on being given a half twist, as shown in FIG. 4 by arrow 151, coupling 149 will no longer be able to pass over ear portions 133 and push/pull rod 131 and knockout rod 139 will be locked together for positive forward and reverse motion of ejector plate 25.

When it is desired to remove a 'mold base from the injection molding machine (FIG. 4), knockout rod 139 would be turned in the direction opposite arrow 151 to disconnect locking collar 149 from push/pull rod 131. Mold balance lifting bar 115 would then be slid over the lifting buttons on the top of the mold base and aligned with the balance mark previously made on the top of the mold base. Clamps 153 (FIG. 1), would then be released by loosening screws 155. The clamps would then be moved out of the way of the edge of the ear plates. A hook can then be passed through I-ring 117 and the balanced mold base can be lifted straight out of the adapter frame plates. If another mold base is equipped with similar ear plates, the same balance lifting bar 115 and I-ring 117 can be used to lower the second mold base into the machine. Knockout rod 139 would be given a half twist to connect the knockout rod and push/pull rod 131 together. Clamps 153 would then be fastened to the edges of the ear plates on the mold base and the molding machine would be ready to make a different part. Using the adapter flames and ear plates of the present invention, a mold base can be changed in as little as ten minutes.

Figure 6:
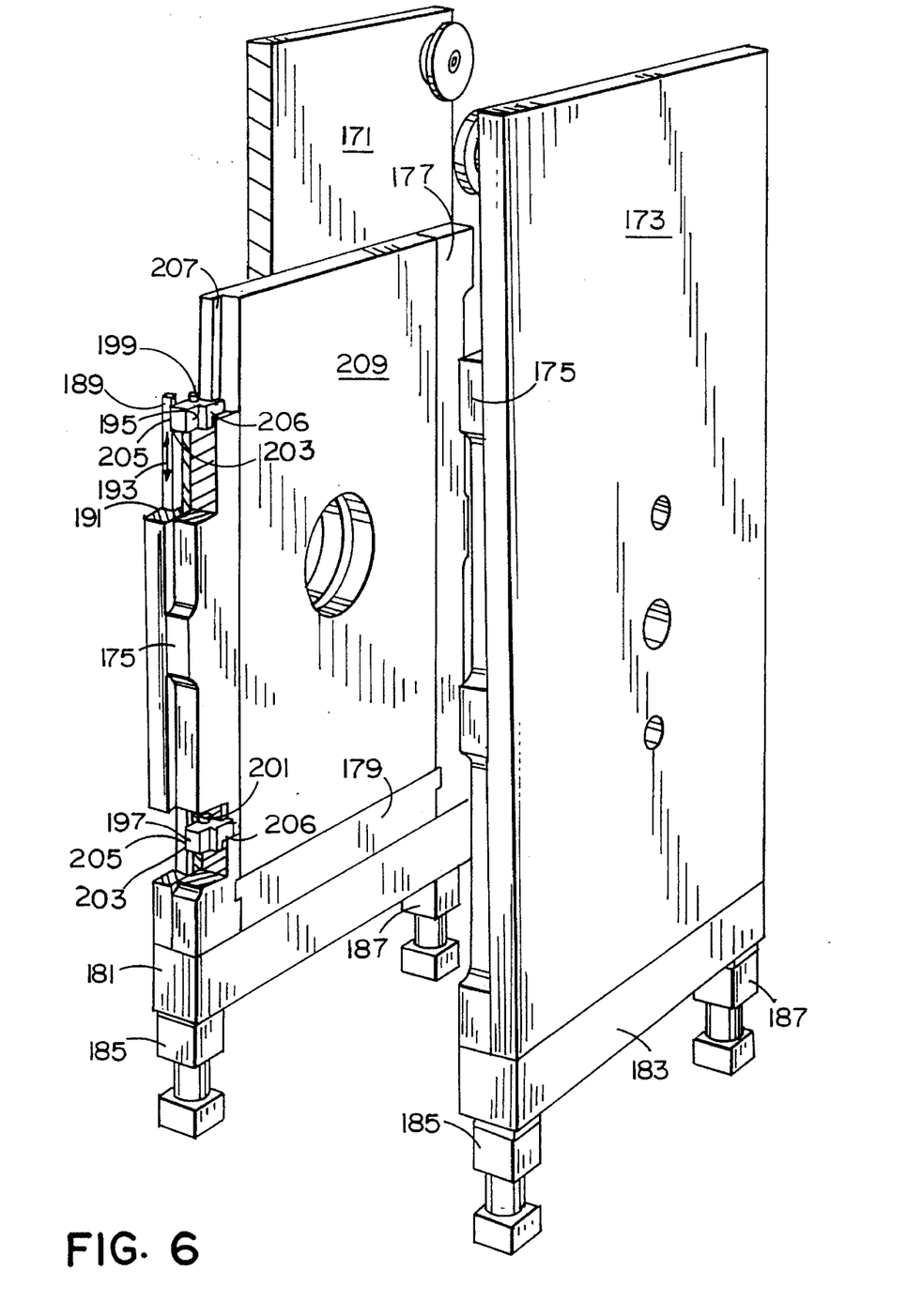
FIG. 6 is a perspective view showing adapter frames with powered clamps for gripping the ear plates attached to a mold base.

In order to further speed up the mold changing process, referring to FIG. 6, each of the adapter frame plates 171 and 173 can be equipped with powered clamps to hold the ear plates and supported mold bases in place. The powered clamps on each adapter frame plate are substantially identical so only one set will be described in detail.

Adapter frame plate 171 has guide rails 175 and 177, and a stop member 179, which form a guide channel on the face of the adapter frame plate. Base members 181 and 183 in the machine support the adapter frame plates.

A pair of extensible cylinders 185 and 187 are attached to the bottom of base members 181 and 183 in alignment with guide rails 175 and 177. The extensible cylinders can be pneumatic or hydraulic. A vertical clamp actuating member 189 is guided in a passage 191 in each guide rail and is moved up and down, as indicated by arrow 193, by the cylinders.

Clamp members 195 and 197 are pivotally mounted on pivot pins 199 and 201 within guide member 175. Each clamp member has a cam follower face 201 which is in contact with spaced cam surfaces 203 on clamp actuating member 189. Each clamp member has a clamping portion 205 for holding the stepped edge 207 of ear plate 209. The clamp portions 205 are closely spaced to the stepped edge of the ear plate and only have to move approximately 0.010–0.015 inch to clamp against the ear plate.

When the powered clamps are used, the press operator does not have to climb a ladder to loosen clamps 153 (FIG. 1) and to retighten the clamps after a new mold base is in position. The press operator merely has to operate a switch (not shown) to raise or lower clamp actuating member 189 to cause the clamps to grip or release the edge of the ear plates simplifying the mold base change process.

The adapter frames can be easily transferred to other machines since the standard mounting points on the machine platens are used to fasten the adapter flames. No special hardware is required. Selecting the largest adapter flames that fit a machine allows the use of standard mold bases up to the machine's maximum capability.

MODIFICATION

A quick change apparatus 300 (FIG. 7) embodying the present invention is configured to operably support a standard mold base 301 in an injection molding machine. It is noted that in FIG. 7, apparatus 300 and mold base 301 are oriented counterclockwise 90° from the position that they would "normally" be in for use in a molding machine, although in some instances molds are installed from a side of a molding machine. Accordingly, the arrow "A" generally indicates the "downward" direction and also indicates an installation direction. (Also, see FIG. 1.) Nonetheless, even though a particular orientation is commonly used, it is contemplated that the present invention can be used in different orientations.

Figures 7, 8, 9:
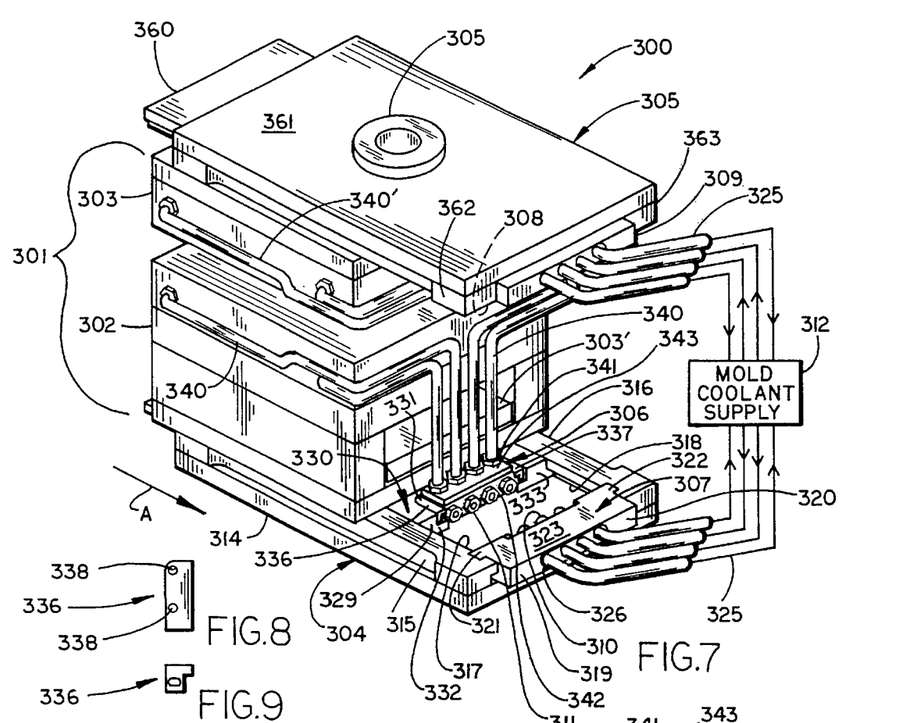
FIG. 7 is a perspective view of a first modified quick change apparatus embodying the present invention, the quick change apparatus including a mold base attached to a pair of ear plates partially inserted into a base plate assembly, the ear plate and base plate including coolant hookup manifolds.
FIG. 8 is a plan view of an L-shaped retainer for securing the ear-plate-attached coolant hookup manifold to the ear plate.
FIG. 9 is an end view of the retainer shown in FIG. 8.

Mold base 301 includes mold halves 302 and 303 which are generally similar to mold halves 21 and 23 previously described herein. An ejector plate 302' is located in mold half 302. Quick change apparatus 300 includes a pair of adapter flames 304 and 305, one for each mold half 302 and 303, respectively. Adapter flames 304 and 305 are not unlike adapter flames 43 and 41 previously described. In particular, adapter flames 304 and 305 include base plate assemblies and ear plates modified to receive coolant hookup plates or manifolds 306, 307, 308 and 309 with aligned connectors 310 and 311. Connectors 310 and 311 are configured to automatically connect as mold base 301 is installed into a molding machine by use of quick change apparatus 300. The coolant hookup manifolds 306 and 308 are connected to ear plates 330 and 360, respectively, and operably connected to coolant passageways in the mold halves 302 and 303, respectively, and the second pair 307 and 309 are connected to base plates 314 and 361, respectively and also operably connected to a source of coolant 312. By using apparatus 300, the mold base 301 is automatically fully connected to the coolant supply 312 upon installation of mold base 301 into the molding machine. This modification simplifies installation of mold base 301 into a molding machine, and substantially eliminates the risk of improperly connected coolant lines after the lines are properly connected a first time.

More particularly, ejector adapter frame 304 (FIG. 7) includes a base plate assembly including a base plate 314 adapted for connection to a movable platen on an injection molding machine. A pair of spaced guide rails 315 and 316 are secured to opposing edges of base plate 3 14. Rails 3 15 and 316 define a pair of opposing channels 317 and 318 on base plate 314. Coolant hookup manifold 307 is secured between guide rails 315 and 316, and forms a U-shaped arrangement with guide rails 3 15 and 316 around the perimeter of base plate 314. Coolant hookup manifold 307 includes end sections 319 and 320 with laterally extending tabs 321 and 322, respectively, that engage notches in guide rails 315 and 316. Coolant hookup manifold 307 further includes a center section 323 having a plurality of passageways 324 (FIG. 10) defined therein. Male connectors 310 are connected to the end 324' of passageways 324 facing ear plate 330, and coolant lines 325 extending from coolant supply 312 are connected to the other end 324" of passageways 324 at locations 326. Usually, coolant lines 325 run in pairs, one being a supply line and one being a drain line. Connectors 310 face in a direction parallel channels 317 and 318 (FIG. 7). Coolant hookup manifold 307 is secured to base plate 314 by bolts (not shown in FIG. 7, but see FIG. 14).

Adapter frame 304 (FIG. 7) further includes an ear plate 330 attached to mold ejector half 302. Ear plate 330 is generally identical to ear plate 83 (FIG. 1 ) but is modified at its bottom to include a generally rectangular notch 331 along its bottom edge 329 for receiving coolant hookup manifold 306. A pair of ledges 332 and 333 are formed at the sides of notch 331. The bottom edge 329 of ear plate 330 is configured to engage the top surface of end sections 319 and 320 to limit/stop the travel of ear plate 330 into channels 317 and 319 as ear plate 330 slideably engages base plate assembly 314/315/316.

Coolant hookup manifold 306 (FIG. 7) is configured to mateably engage notch 331 in ear plate 330 and includes end tabs that extend onto ledges 332 and 333 respectively. A pair of elongated L-shaped retainers 336 and 337 (FIGS. 7–9) mateably engage the end tabs and are clamped against the end tabs by a pair of bolts (not specifically shown) that extend through holes 338 in the retainers 336 (and 337). The clamp retainers 336 and 337 against the end tabs of coolant hookup manifold 306 and against ear plate 330 to securely hold coolant hookup manifold 306 on ear plate 330.

Figure 10:
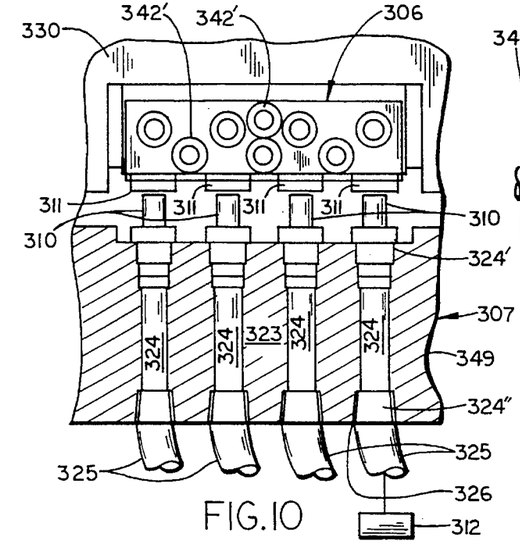
FIG. 10 is a fragmentary plan view, partially in cross section, of the mating coolant hookup manifolds, the hookup manifolds being shown aligned and ready for interconnection but immediately before interconnection.
Figures 11, 12:
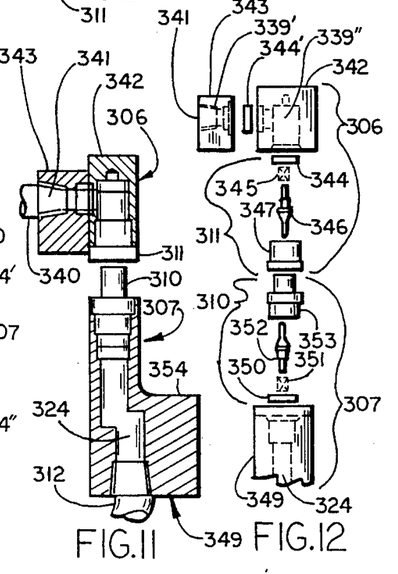
FIG. 11 is a side view of the coolant hookup manifolds shown in FIG. 10.
FIG. 12 is an exploded side view of the coolant hookup manifolds shown in FIG. 11.
Figure 13:
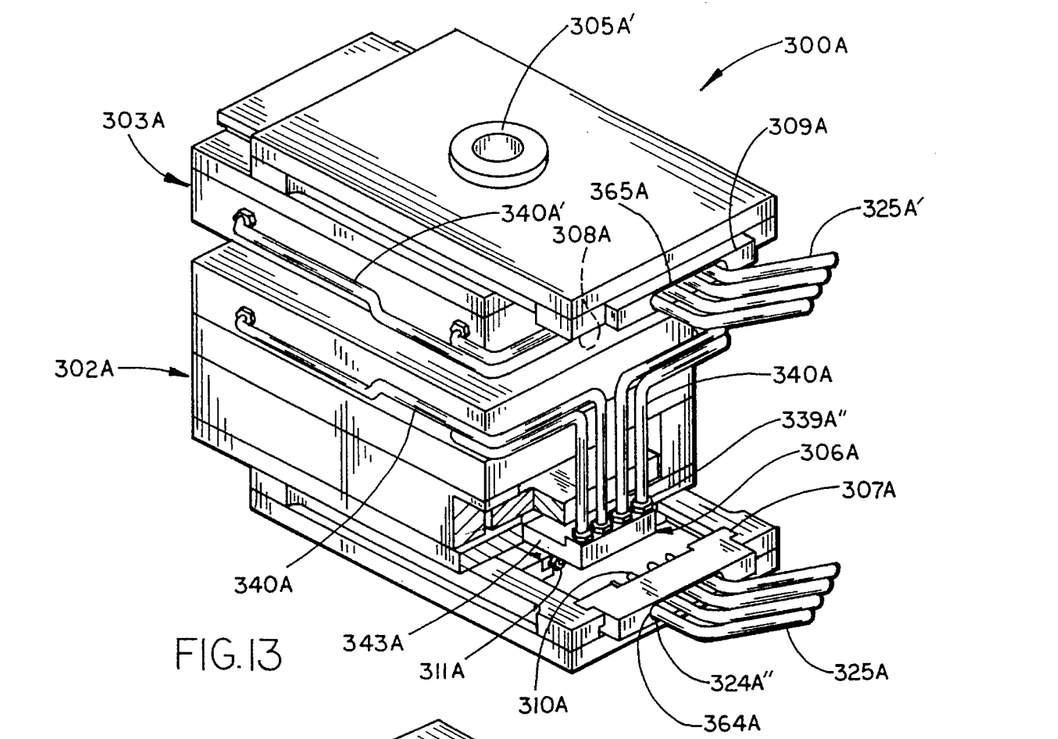
FIG. 13 is a perspective view of a second modified quick change apparatus including an extended coolant hookup manifold attached to the ear plate and a modified base mounted coolant hookup manifold including recessed connections for the coolant supply lines.

Coolant hookup manifold 306 (FIG. 12) includes a first block 342 for supporting female connectors 311, and a second block 343 attached to first block 342 by bolts 342' (FIG. 10). An aligner 344' is connected between blocks 342 and 343. Second block 343 defines the locations 341 for receiving mold coolant lines 340 (FIG. 7). Locations 341 include pipe threads for receiving standard pipe nipples for engaging mold coolant lines 340. Notably, coolant hookup manifold 306 can be made as a one piece block rather than two piece (i.e. blocks 342 and 343). Also, block 342 can be made to be universally connectable to different blocks, such as block 343A (FIG. 16) described hereinafter.

A plurality of passageways 339 including legs 339' and 339" are formed in blocks 343 and 342, respectively, of coolant hookup manifold 306. Female connectors 311 are connected to the lower end 339" of passageways 339. Mold coolant lines 340 extending from and around mold half 302 are connected to the other end 339' of passageways 339 at locations 341. Female connectors 311 face in a direction parallel channels 3 17 and 318 (FIG. 7). In particular, female connectors 311 face toward and align with male connectors 3 10 when ear plate 330 is being slid into channels 3 17 and 318 on base plate assembly 314/315/316. Female connectors 311 are configured to automatically sealingly engage male connectors 3 10 without substantial leakage of coolant when brought together, and are further configured to also automatically sealingly release male connectors 310 without substantial leakage of coolant when separated. Female connector 311 (FIG. 12) includes a guide and support ring 344, a valve closing biasing spring 345, a valve stem 346 and a female receptacle defining member 347 operably positioned in a passageway 339" in first block 342. Notably, it is contemplated that coolant hookup manifold 306 could be incorporated into ear plate 330, in which case passageways 339 would be formed in ear plate 330 per se.

The coolant hookup manifold 307 attached to base plate 3 14 (FIG. 7) and side rails 315 and 316 includes a block 349 (FIGS. 10-12) with the passageways 324 defined therein. Male connectors 310 are operably positioned in one end 324' of the passageways 324 for operative engagement with female connectors 311, and the other end 324' of the passageways 324 are connected to mold coolant line 325 connected to coolant supply 312. Male connectors 310 (FIG. 12) include a guide and support ring 350, a valve closing biasing spring 351, a valve stem 352, and a male protrusion defining member 353. Block 349 includes an enlarged end 354 configured to mateably engage base plate 314, and further includes holes (not shown, but see FIG. 14) for receiving bolts to secure block 349 to base plate 314.

Coolant hookup manifold 308 (FIG. 7) is attached to an ear plate 360 on adapter frame 305 of the cavity mold half 303 in the same way that coolant hookup manifold 306 is attached to ear plate 330 on the ejector mold half 302. Also, mold coolant lines 340' are connected to mold half 302. Coolant hookup manifold 309 is attached to base plate 361 and guide rails 362 and 363 on cavity adapter frame 303 in the same way that coolant hookup manifold 308 is attached to base plate 314 and guide rails 315 and 316 on ejector adapter frame 304. Also, coolant supply lines 325' are connected to coolant supply 312. Thus, the description need not be repeated since it would be redundant.

To use quick change apparatus 300, ear plates 330 and 360 are attached to mold base halves 302 and 303, respectively. Also, base plate assemblies 314/315/316/307 and 361/362/363/309 are attached to the platens of an injection molding machine. To install mold base 301 into the injection molding machine, ear plates 330 and 360 are slideably engaged with base plate assemblies 314/315/316 and 361/362/363, with the edges of ear plate 330 engaging channels 317 and 318 and with the edges of ear plate 360 engaging channels defined by guide rails 362 and 363. As ear plates 330 and 360 slid into a "home" position on base plate assemblies 314/315/316 and 361/362/363, coolant hookup connectors 310 and 311 mateably engage and automatically connect. Thus, the lines for communicating coolant from coolant supply 312 to mold base halves 302 and 303 are automatically connected as part of the installation. To remove mold base 301, the above noted process is reversed. Notably, the connectors 310 and 311 are configured to automatically release.

Modified quick change apparatus are shown in FIGS. 13–27. To reduce redundant discussion, similar and identical features and components to apparatus 300 are referred to with identical members but with the addition of the letters "A," "B," "C," "D" and "E".

Modified quick change apparatus 300A (FIGS. 13–16) includes modified coolant hookup manifolds 306A-309A so that a longer mold base 302A/303A can be received. For example, in coolant hookup manifold 306A (FIG. 13), block 343A is extended so that a longer mold base 302A can be received. In particular, mold base 302A is so long that it partially overhangs coolant hookup manifolds 306A and 307A when installed using apparatus 300A. Nonetheless, extended coolant hookup manifold 306A allows long mold base 306A to drop to a centered position in the injection molding machine such that the position of the injection ring 305A' is centered in the molding machine. Further, extended coolant hookup manifold 306A positions female connectors 311A in a recessed position for operative attachment to connectors 311A and positions the outlets 339A" in a protruding position for receiving mold coolant lines 340A. Also, the ends 324A" of passageways 324A, are recessed into recesses 364A (and 365A) in coolant hookup manifolds 307A (and 309A) so that there is less risk of damaging the connections.

Figures 14, 15, 16, 17, 18, 19, 20, 21, 24, 25:
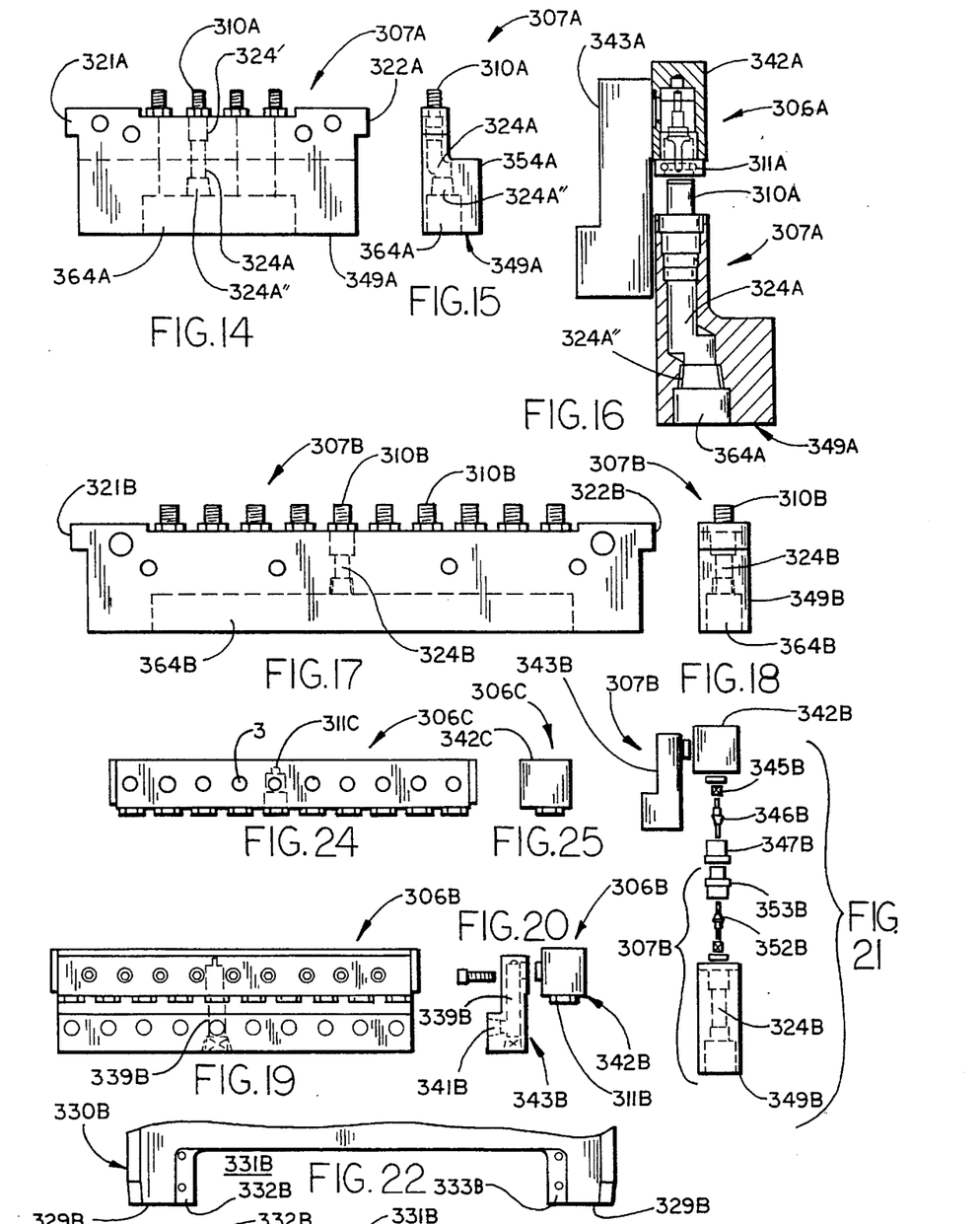
FIG. 14 is a plan view of the modified base mounted coolant hookup manifold shown in FIG. 13.
FIG. 15 is a side view of the coolant hookup manifold shown in FIG. 14.
FIG. 16 is a side view of the mating coolant hookup manifolds shown in FIG. 13 including the extended coolant hookup manifold attached to the ear plate.
FIG. 17 is a plan view of a third modified coolant hookup manifold for attachment to a base plate, the modified coolant hookup manifold including ten male connectors.
FIG. 18 is a side view of the third modified hookup manifold shown in FIG. 17.
FIG. 19 is a third modified extended coolant hookup manifold for attachment to an ear plate, the modified coolant hookup manifold including ten female connectors configured for interconnection with the coolant hookup manifold shown in FIG. 17.
FIG. 20 is a partially exploded side view of the modified hookup manifold shown in FIG. 19.
FIG. 21 is an exploded side view of the hookup manifolds shown in FIGS. 17 and 19.
FIG. 24 is a plan view of a fourth modified coolant hookup manifold for attachment to an ear plate, the coolant hookup manifold including ten female connectors.
FIG. 25 is a side view of the coolant hookup manifold shown in FIG. 24.
Figure 26:
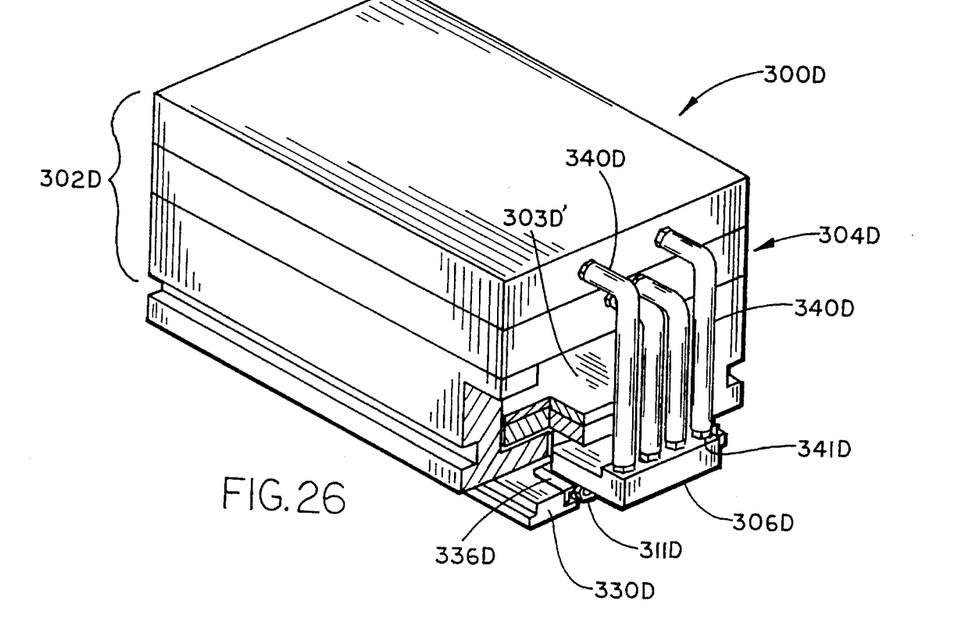
FIG. 26 is a fragmentary, perspective view of a mold half assembled to an ear plate including an extended coolant hookup manifold and a modified arrangement of coolant lines extending from the coolant hookup manifold to the mold half.

The coolant hookup manifolds 306B and 307B (FIGS. 17–23) for a third modified quick change apparatus define a ten port system. The notch 331B in ear plate 330B (FIGS. 22–23) is widened to receive the elongated coolant hookup manifold 306B (FIG. 17). The mating coolant hookup manifold 307B (FIG. 17) is elongated and modified to include ten passageways 324B. Coolant hookup manifold 307B (FIGS. 19–20) also has an increased width, and ten passageways 339B are formed therein. Notably, coolant hookup manifold 306B includes an extended block 343B. In another embodiment, the block 342C for coolant hookup manifold 306C (FIGS. 24–25) is not extended. Notably, it is contemplated that various configurations can be made to accommodate various mold bases, such as by having coolant hookup manifolds including a different number of ports, different widths, different dimensions, and the like, only the basic concepts of which are disclosed herein. As an example of one modification, the quick change apparatus 300D (FIG. 26) includes an extended coolant hookup manifold 306D where L-shaped mold coolant lines 340D are connected to mold base half 304D.

Figure 27:
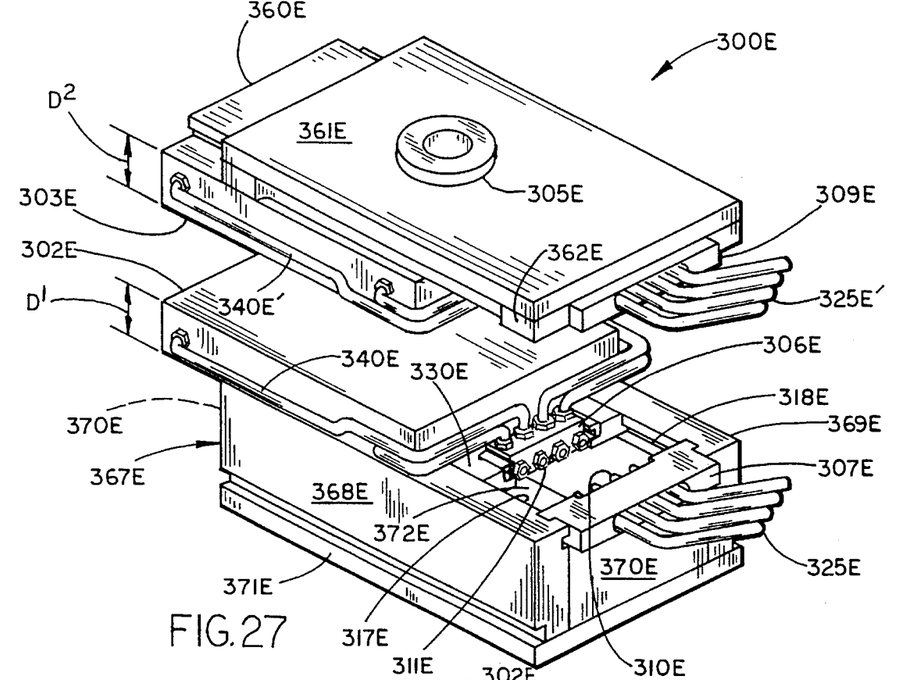
FIG. 27 is a partially exploded perspective view of a modified quick change apparatus including mold halves connected to ear plates, the ear plates being partially installed on base plates, the base plate being modified to include a spacer member for spacing the mold from a molding machine platen.
Figure 28:
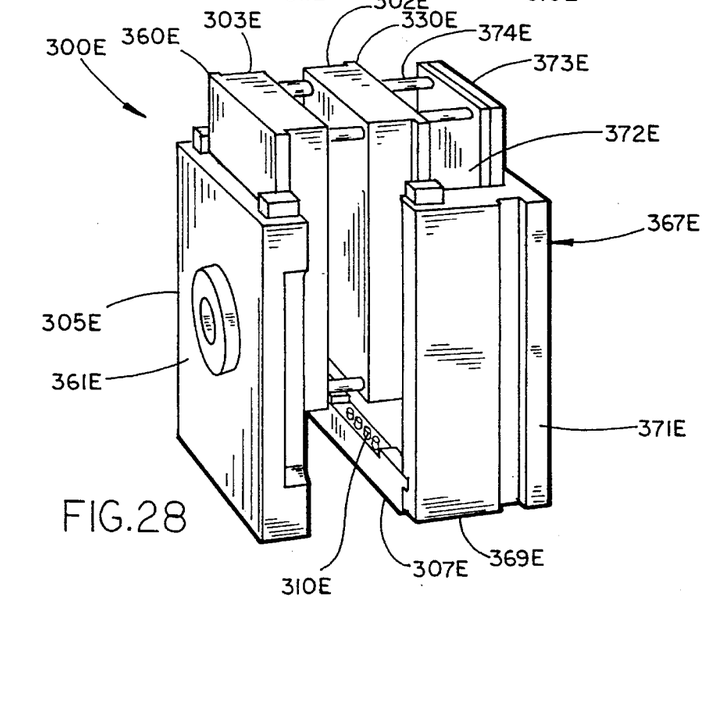
FIG. 28 is a partially exploded view of the modified quick change apparatus shown in FIG. 27.

In FIGS. 27 and 28, a quick change apparatus 300E embodying the present invention includes a base plate 367E that spaces channels 317E and 318E and coolant hookup manifold 307E from the molding machine platen to create a space 372E for receiving an "external" ejector plate 373E on mold 302E/303E. Notably, mold halves 302E and 303E are relatively thin and have dimensions D1 and D2 respectively. Ejector plate 373E is movably positioned in space 372E on guide rods 374E that slideably engage mold half 302E. Ejector plate 373B is operably connected to an ejector plate actuator (not shown) on the injection molding press. Ejector rods (not shown) for ejecting molded parts from mold half 302E are connected to ejector plate 373E. Base plate 367E is made from side members 368E and 369E and end members 370E attached to a back plate 371E.

Although the invention has been described with respect to specific preferred embodiments thereof, many Variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows.

1. A quick change apparatus for mold bases including coolant lines, comprising:

an adapter frame for attachment to each platen in a press, said adapter frame comprising:

a base plate assembly including a base plate having a plurality of apertures therein for attaching said base plate to a platen;

a pair of spaced guide rails on said base plate, each of said guide rails having a stepped edge including a narrow portion and a wider portion, each guide rail being positioned along opposite edges of said base plate with said narrow edge portion attached to said base plate and with the wider edge portion of each of said guide rails facing inwardly and spaced from said base plate to define a guide channel on the face of said base plate;

said base plate assembly including a stop along one edge extending between and closing said guide channel defined by said guide rails; and an ear plate for attachment to each half of a mold base, said ear plate being configured to fit within the guide channel on each adapter frame, said ear plate including a first coolant hookup manifold for connection to the coolant lines extending from the mold base; and a second coolant hookup manifold configured to mateably engage said first coolant hookup manifold and attached to said pair of spaced guide rails.

2. A quick change apparatus as defined in claim 1 wherein said second coolant hookup manifold comprises said stop.

3. A quick change apparatus as defined in claim 2 wherein said first and second coolant hookup manifolds include mating connectors that are aligned for engagement as said ear plate slideably engages said guide channels on said base plate assembly.

4. A quick change apparatus as defined in claim 3 wherein said mating connectors are adapted to automatically connect as said ear plate is installed on said base plate assembly.

5. A quick change apparatus as defined in claim 3 wherein said second coolant hookup manifold includes an extended block for positioning the mating connectors on said second coolant hookup manifold in a predetermined location relative to the mold base.

6. A quick change apparatus as defined in claim 1 including first means on said ear plate for communicating coolant to said mold base, said first means including said coolant hookup manifold, second means on said base plate assembly for communicating coolant to said first means from a source of coolant, and third means for interconnecting said first and second means.

7. A quick change apparatus as defined in claim 6 wherein said third means comprises an arrangement of automatically connectable connectors.

8. A quick change apparatus as defined in claim 7 wherein said third means includes at least four pairs of connectors.

9. A quick change apparatus for a mold base used in a press comprising:

an ear plate for attachment to the back of each half of a mold base, said ear plate including, first coolant hookup passageways operably connected to said mold base for communicating coolant thereto;

an adapter frame for attachment to each platen of a press, said adapter frame including a pair of guide channels for receiving and supporting said ear plate, a stop for engaging said ear plate to limit the travel of said ear plate into said pair of guide channels, and second coolant hookup passageways for connection to a supply of coolant; and mating connectors operably connected to said first and second coolant hookup passageways and configured to automatically interconnect when said ear plate is installed in said adapter frame.

10. A quick change apparatus as defined in claim 9 wherein said second coolant hookup passageways are formed in said stop.

11. A quick change apparatus as defined in claim 10 including first and second coolant hookup manifolds defining said first and second coolant hookup passageways, said mating connectors being attached to said first and second coolant hookup manifolds and being axially aligned for engagement as said ear plate slideably engages said guide channels on said adapter frame.

12. A quick change apparatus as defined in claim 11 wherein said second coolant hookup manifold includes an extended block for positioning the mating connectors on said second coolant hookup manifold in a predetermined location relative to the mold base.

13. A quick change apparatus as defined in claim 9 wherein said adapter frame includes a spacer that spaces the pair of guide channels from the press platen.

14. A quick change apparatus as defined in claim 1 wherein said first coolant hookup plate defines an offset passageway for operably connecting to said second coolant hookup plate, said first coolant hookup plate being constructed to permit attachment of an elongated mold base having a portion that overhangs said second coolant hookup plate when said first and second coolant hookup plates are operably engaged.

15. A quick change apparatus as defined in claim 1 wherein said second coolant hookup plate includes tabs at each end that interlockingly engage corresponding notches in said guide rails to provide structural support for said second coolant hookup plate.

16. A quick change apparatus for mold bases including coolant lines, comprising:

an adapter frame for attachment to each platen in a press, said adapter frame comprising:

a base plate assembly including a base plate having a plurality of apertures therein for attaching said base plate to a platen;

a pair of spaced guide rails on said base plate, each of said guide rails having a stepped edge including a narrow portion and a wider portion, each guide rail being in positioned along opposite edges of said base plate with said narrow edge portion attached to said base plate and with the wider edge portion of each of said guide rails facing inwardly and spaced from said base plate to define a guide channel on the face of said base plate;

said base plate assembly including a stop along one edge extending between and closing said guide channel defined by said guide rails; and an ear plate for attachment to each half of a mold base, said ear plate being configured to fit within the guide channel on each adapter frame, said ear plate including a first coolant hookup manifold for connection to the coolant lines extending from the mold base;

a second coolant hookup manifold attached to said pair of spaced guide rails, said second coolant hookup manifold comprising said stop;

said first and second coolant hookup manifolds including mating connectors that are aligned for engagement as said ear plate slideably engages said guide channels on said base plate assembly, said mating connectors being adapted to automatically connect as said ear plate is installed on said base plate assembly;

said first coolant hookup plate defining an offset passageway for operably connecting to said second coolant hookup plate, said first coolant hookup plate being constructed to permit attachment of an elongated mold base having a portion that overhangs said second coolant hookup plate when said first and second coolant hookup plates are operably engaged; and said second coolant hookup plate including tabs at each end that interlockingly engage corresponding notches in said guide rails to provide structural support for said second coolant hookup plate.

* * * * *